United States Patent
Fedder et al.

(10) Patent No.: US 8,690,691 B2
(45) Date of Patent: Apr. 8, 2014

(54) MOTOR ADAPTER WITH A TORQUE ARM

(75) Inventors: Ronald J. Fedder, Germantown, WI (US); Richard Borzyskowski, Elkhorn, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 1650 days.

(21) Appl. No.: 11/860,018

(22) Filed: Sep. 24, 2007

(65) Prior Publication Data

US 2008/0073994 A1    Mar. 27, 2008

Related U.S. Application Data

(60) Provisional application No. 60/847,607, filed on Sep. 27, 2006.

(51) Int. Cl.
 *F16D 3/84* (2006.01)

(52) U.S. Cl.
 USPC ............................................. 464/170

(58) Field of Classification Search
 USPC .......... 464/170, 172, 177; 248/649, 672, 673, 248/676; 417/359; 74/609
 See application file for complete search history.

(56) References Cited

U.S. PATENT DOCUMENTS

| | | | |
|---|---|---|---|
| 1,369,667 A * | 2/1921 | Junggren | 248/676 X |
| 1,991,543 A * | 2/1935 | Cook | |
| 2,323,153 A * | 6/1943 | Pilson | 248/672 |
| 2,394,846 A * | 2/1946 | Cox, Jr. | |
| 3,363,435 A | 1/1968 | Crow | |
| 3,548,678 A | 12/1970 | Phillips | |
| 4,098,139 A | 7/1978 | Sankey | |
| 4,265,136 A | 5/1981 | Riegler et al. | |
| 5,344,291 A | 9/1994 | Antkowiak | |
| 5,690,304 A | 11/1997 | Folkens | |
| 6,328,655 B1 | 12/2001 | Zimmermann et al. | |
| 2005/0066756 A1 | 3/2005 | Clare et al. | |

FOREIGN PATENT DOCUMENTS

DE    962 709    *    4/1957

OTHER PUBLICATIONS

Alignment Free Drives, The Falk Corporation, Apr. 2003.

* cited by examiner

*Primary Examiner* — Gregory Binda
(74) *Attorney, Agent, or Firm* — Quarles & Brady LLP

(57) ABSTRACT

A motor adapter includes a frame having a first end adapted for mounting to a motor and a second end adapted for mounting to a rotatably driven machine. The frame includes an adjustable reaction point.

18 Claims, 3 Drawing Sheets

ମOTOR ADAPTER WITH A TORQUE ARM

CROSS REFERENCES TO RELATED APPLICATIONS

This application claims the priority benefit of U.S. Provisional Patent application No. 60/847,607 filed on Sep. 27, 2006.

STATEMENT REGARDING FEDERALLY SPONSORED RESEARCH

Not Applicable.

BACKGROUND OF THE INVENTION

This invention relates to motor adapters, and more particularly, to a motor adapter having a torque arm.

A motor adapter, such as available from Rexnord Industries, LLC, Milwaukee, Wis., joins a motor to a rotatably driven machine, such as a drive or pump. The adapter substantially aligns a motor shaft of the motor with an input shaft of the rotatably driven machine. A coupling couples the motor shaft to the input shaft. Typically, torque generated by the motor is absorbed by a torque arm extending between the motor and an anchor fixed relative to the ground. Unfortunately, reaction points on the motor housing for attaching the torque arm to the motor are fixed. When the location of the reaction points are not aligned with the anchors, installation of the torque arm for withstanding the expected load is difficult, if not impossible. As a result, the motor housing must be specifically engineered for the particular application or suitability of the torque arm for the intended use is compromised.

SUMMARY OF THE INVENTION

The present invention provides a motor adapter including a frame having a first end adapted for mounting to a motor and a second end adapted for mounting to a rotatably driven machine. The frame includes an adjustable reaction point.

A general object of the present invention is to provide motor adapter that can accommodate misaligned reaction points for a torque arm. This object is accomplished by providing a motor adapter with a frame having an adjustable reaction point.

The foregoing and other objects and advantages of the invention will appear from the following description. In the description, reference is made to the accompanying drawings which form a part hereof, and in which there is shown by way of illustration a preferred embodiment of the invention.

Figure 1:
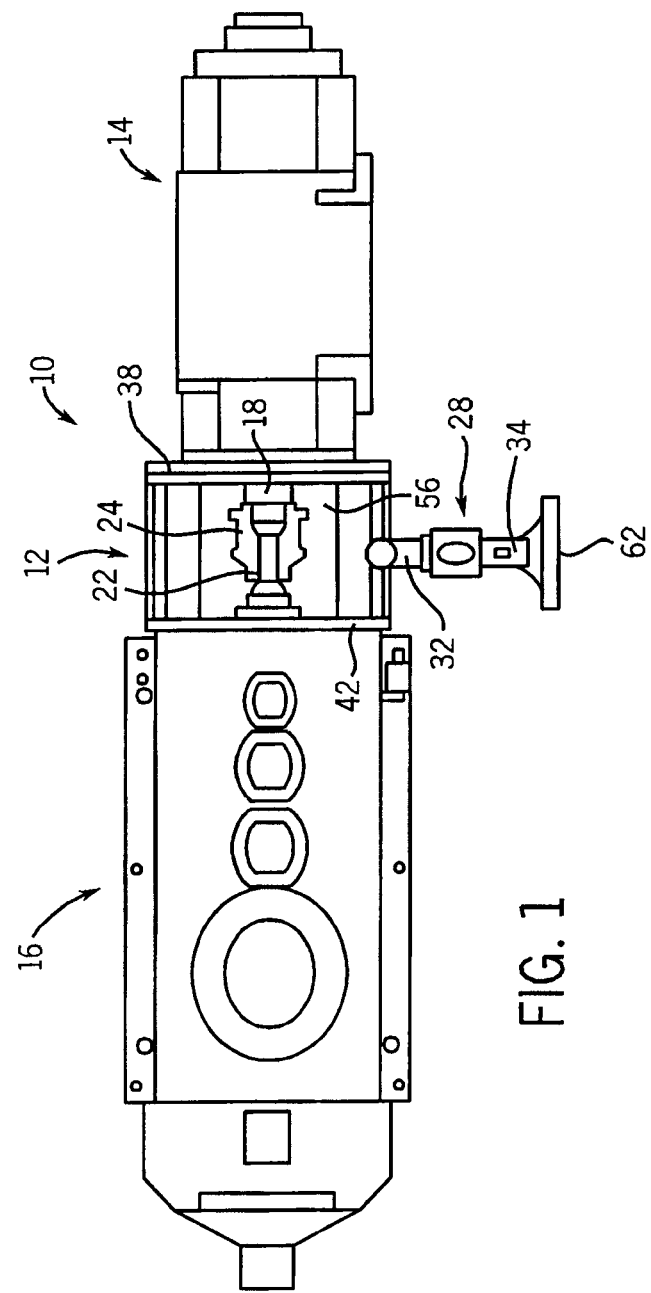
FIG. 1 is side view of a motor/drive assembly incorporating the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded is limiting.

DESCRIPTION OF THE PREFERRED EMBODIMENT

As shown in FIG. 1, a motor/drive assembly 10 incorporating the present invention includes a motor adapter 12 joining a motor 14 to a rotatably driven machine 16, such as a gear drive, pump, and the like. The motor adapter 12 aligns a motor drive shaft 18 extending from the motor 14 with an input shaft 22 extending from the rotatably driven machine 16. A coupling 24 rotatively couples the drive shaft 18 with the input shaft 22 which is rotatably driven by the drive shaft 18. A torque arm 28 fixed to the motor adapter 12 is anchored to the ground or an immovable structure, and counteracts torque generated by the motor 14 as the drive shaft 18 rotatably drives the input shaft 22. The torque arm 28 is slidably connected to the motor adapter 12 which allows properly locating one end 32 of the torque arm 28 relative to the motor adapter 12 to securely anchor an opposing end 34 of the torque arm 28 to the ground or immovable structure. Advantageously, the motor adapter 12 described herein avoids the problem of field misalignment of torque reaction points (i.e. the points of connection of the torque arm ends 32, 34) by providing an adjustable torque reaction point on the motor adapter 12.

Figure 2:
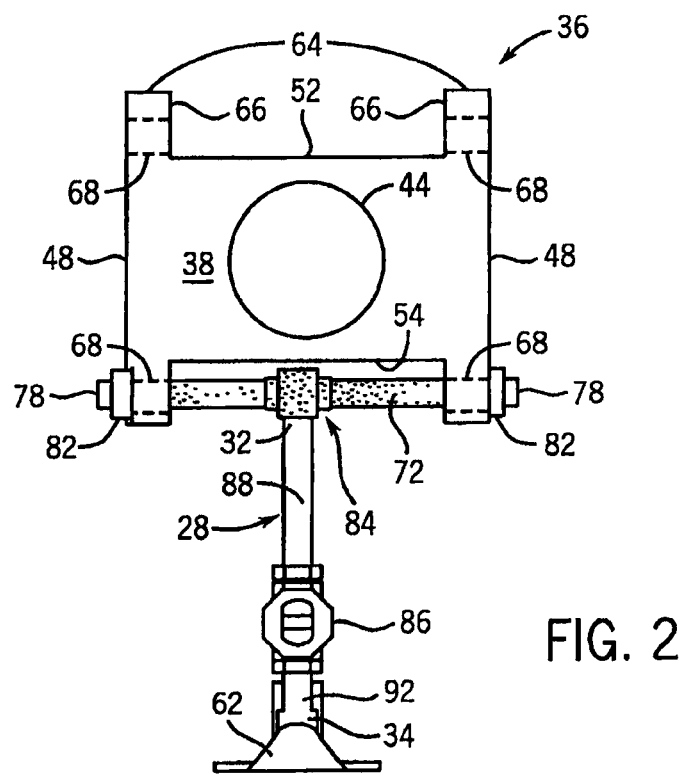
FIG. 2 is an end view of the motor adapter shown in FIG. 1.
Figure 3:
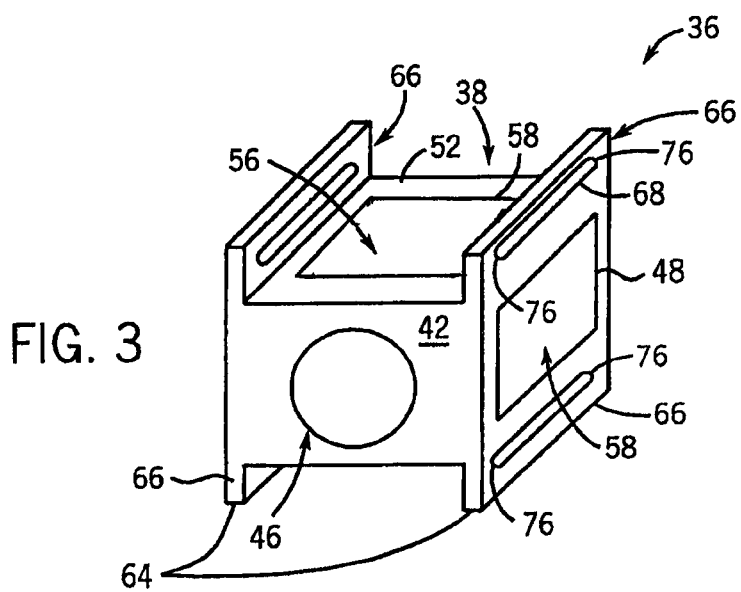
FIG. 3 is a perspective view of the frame shown in FIG. 2.

Referring to FIGS. 1-3, the motor adapter 12 includes a frame 36 having a first end wall 38 fixed to the motor 14 and a second end wall 42 fixed to the rotatably driven machine 16. Preferably the first and second end walls 38, 42 are fixed to the motor 14 and rotatably driven machine 16 using bolts extending through bolt holes aligned with threaded bolt holes formed in motor 14 and rotatably driven machine 16. An aperture 44 formed through the first end wall 38 receives the motor drive shaft 18 therethrough. Likewise, an aperture 46 formed through the second end wall 42 receives the input shaft 22 therethrough.

The end walls 38, 42 are rigidly joined by spaced side walls 48, a top wall 52, and a bottom wall 54 defining a frame interior 56. The motor drive shaft 18 and input shaft 22 extend into the frame interior 56, and are coupled by the coupling 24 in the interior 56 of the frame 36. Preferably, the frame end walls 38, 42, side walls 48, top wall 52, and bottom wall 54 are rigidly joined using methods known in the art, such as welding, to form a rigid frame 36 capable of withstanding forces exerted on frame 36 by the motor 14 and rotatably driven machine 16.

Openings 58 formed through the top wall 52, bottom wall 54, and side walls 48 provide access to the coupling 24 in the frame interior 56 for coupling 24 removal, installation, and/or inspection. Preferably the openings 58 are covered by detachable covers (not shown) which enclose the coupling 24 inside the frame 36. Advantageously, enclosing the coupling 24 inside the frame 36 with the covers contains any debris in the event of a coupling 24 failure and prevents inadvertent contact with revolving components. Preferably, the covers are detachably fixed to the frame walls 48, 52, 54 using screws or bolts.

The side walls 48 extend outwardly beyond the top and bottom walls 52, 54 to form pairs 64 of spaced rails 66. The rails 66 include slots 68 extending parallel to the top and bottom walls 52, 54 for slidably receiving a cross bar 72 which slidably connects the torque arm 28 to the frame 36. Advantageously, two pairs 64 of spaced rails 66 extending beyond the top and bottom walls 52, 54 of the frame 36 provide a universal frame 36 that can be rotated 180° to align the bolt holes in the end walls 38, 42 with the bolt holes formed in the motor 14 and rotatably driven machine 16. Moreover, the rails 66 serve as skids allowing the frame 36 to be dragged on the ground in certain environments without damaging machined surfaces of the frame 36. Although rails 66 forming an integral part of the side walls 48 are shown, the rails 66 can be formed as an integral part of the end walls 38, 42 or the top and bottom walls 52, 54 without departing from the scope of the invention. Moreover, the rails 66 can be formed as separate pieces which are fixed to the top wall 52, bottom wall 54, and/or side walls 48, such as by bolts, welds, and the like without departing from the scope of the invention.

The cross bar 72 extends through the slots 68 of one pair of the spaced rails 66 and provides a reaction point for the torque arm 28. The cross bar 72 is movable in each slot 68 between slot ends 76 for locating the cross bar 72 at a desired location for fixing the torque arm 28 thereto. Each end 78 of the cross bar 72 is threaded for threadably engaging nuts 82 that detachably fix the cross bar 72 relative to the adapter 12 once the cross bar 72 is properly positioned. Advantageously, providing a pair of spaced rails 66 extending past each of the top and bottom walls 52, 54 allows mounting the torque arm 28 on the top or bottom of the adapter 12. This arrangement provides a drive assembly incorporating the adapter 12 applicable in right and left hand configurations. Although nuts 82 threadably engaging the cross bar 72 to fix the cross bar 72 relative to the frame 36 are disclosed, the cross bar 72 can be fixed relative to the frame 36 using any methods known in the art, such as by clamping, welding, and the like, without departing from the scope of the invention.

The torque arm 28 has one end 32 fixed to the cross bar 72 by a slide assembly 84 that is movable in an axial direction relative to the cross bar 72 between the rails 66. The slide assembly 84 is a cylindrical bushing encircling the cross bar 72 and fixed to the torque arm one end 32 using methods known in the art, such as welding. Alternatively, the slide assembly 84 can be eliminated with the cross bar 72 extending through an aperture bored through the torque arm one end 32 without departing from the scope of the invention. Advantageously, the location of the torque arm one end 32 relative to the frame 36 is adjustable in an XY plane bound by the length of the rail slots 68 and spacing of the rails 66 of a pair 64 of rails 66 to provide significant flexibility for locating the torque arm one end 32 relative to frame 36 at a reaction point on the cross bar 72.

The torque arm 28 is axially adjustable using a turnbuckle 86 threadably engaging a base section 88 including the one end 32 and an extension section 92. Rotation of the turnbuckle 86 changes the axial spacing of the two sections 88, 92, and thus the length of the torque arm 28. The extension section 92 of the torque arm 28 includes the other end 34 of the torque arm 28 and is fixed to an anchor 62 using methods known in the art, such as bolts. The anchor 62 is fixed relative to the ground or immovable structure using fasteners, such as bolts. Of course, the extension section 92 can be fixed directly to an immovable structure without an anchor without departing from the scope of the invention.

In use, the motor adapter frame first and second end walls 38, 42 are mounted to faces of the motor 14 and rotatably driven machine 16, respectively, with the drive shaft 18 and input shaft 22 extending into the interior 56 of the frame 36 through the end wall apertures 44, 46. The coupling 24 is assembled on facing ends of the drive shaft 18 and input shaft 22 coupling the drive shaft 18 and input shaft 22 together. If provided, the covers are then affixed over the frame openings 58.

The cross bar 72 is slipped through the torque arm slide assembly 84 and each end of the cross bar 72 is inserted through one of the slots 68 of one of the spaced rails 66 of a pair of rails 66. The cross bar 72 is moved between the slot end 76 of the slots 68 in which the cross bar 72 is received to position the one end 32 of the torque arm 28 relative to the end walls 38, 42 at a desired location for anchoring the other end 34 of the torque arm 28 to the anchor 62 or immovable structure. The nuts 82 threadably engaging each end of the cross bar 72 are then tightened to fix the cross bar 72 relative to the slot ends 76 and prevent further movement of the cross bar 72 relative to the frame 36, while allowing the one end 32 of the torque arm 28 to move between the rails 66 on the cross bar 72 when anchoring the other end 34 of the torque arm 28 to the anchor 62. The length of the torque arm 28 is then adjusted by rotating the turnbuckle 86 to anchor the other end 34 of the torque arm 28 to the anchor or other immovable structure.

Figure 4:
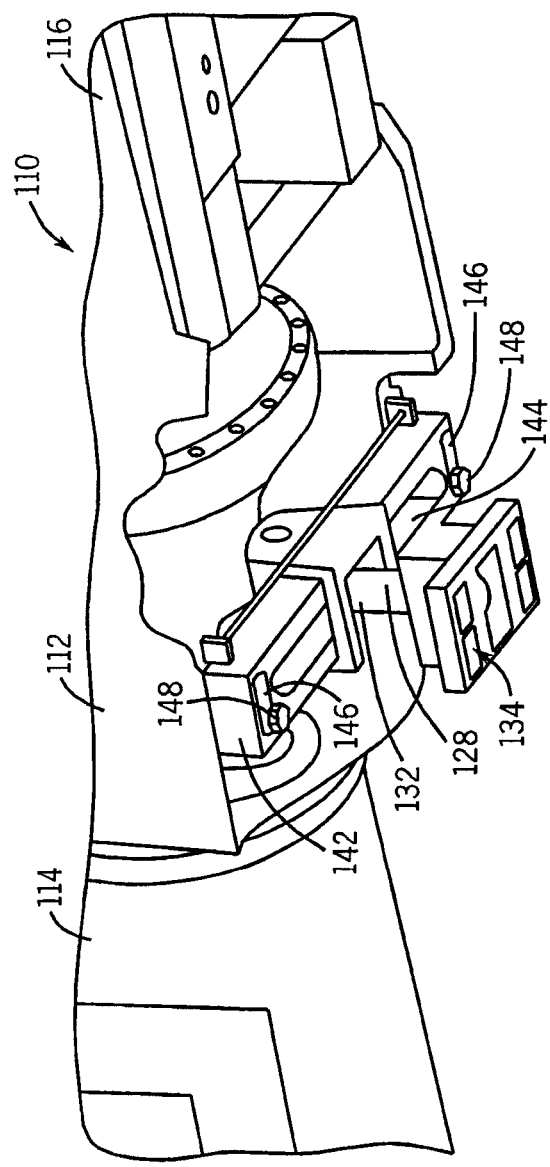
FIG. 4 is a bottom perspective view of another motor/drive assembly incorporating the present invention.

In another embodiment of the present invention shown in FIG. 4, a motor/drive assembly 110 incorporating the present invention includes a motor adapter 112 joining a motor 114 to a rotatably driven machine 116, such as a gear drive, pump, and the like. A torque arm 128 fixed to the motor adapter 112 is anchored to the ground or an immovable structure. The torque arm 128 is slidably connected to the motor adapter 112 by a slotted rail 142 which allows properly locating one end 132 of the torque arm 128 relative to the motor adapter 112 to securely anchor an opposing end 134 of the torque arm 128 to the ground or immovable structure.

As shown in FIG. 4, the slotted rail 142 includes a longitudinal slot 144 which allows side-to-side adjustment of the torque arm 128. The torque arm one end 132 extends through the longitudinal slot 144 and is secured relative to the slotted rail 142 by a nut (not shown) threadably engaging threads formed on the torque arm one end 132.

Transverse slots 146 adjacent opposing ends of the longitudinal slot 144 allows front-to-back movement of the slotted rail 142 to adjust the front-to-back location of the torque arm 128. Bolts 148 extending through the transverse slots 146 threadably engage threaded holes (not shown) formed in the motor adapter 112 to secure the slotted rail 142 to the motor adapter 112.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

We claim:

1. A motor adapter comprising:
a frame having a first end adapted for mounting to a motor and a second end adapted for mounting to a rotatably driven machine, an aperture formed through said first end for receiving a motor drive shaft therethrough for coupling to an input shaft extending through an aperture formed through said second end said first and second ends being joined by at least one wall having an opening which provides access to an interior of said frame; and
a torque arm slidably attached to said frame.

2. The motor adapter as in claim 1, in which said torque arm is slidably mounted to a bar slidably mounted to said frame to slidably attach said torque arm to said frame.

3. The motor adapter as in claim 2, in which said frame includes a pair of substantially parallel rails having slots, and said bar extends between said rails into said slots.

4. The motor adapter as in claim 3, in which said bar is fixable relative to said frame.

5. The motor adapter as in claim 1, in which said torque arm has a variable length.

6. The motor adapter as in claim 1, in which said torque arm is slidably mounted to a slotted rail fixed to said frame to slidably attach said torque arm to said frame.

7. A motor adapter joining a motor to a rotatably driven machine; said motor adapter comprising:
    a frame extending between the motor and rotatably driven machine said frame including first and second ends joined by at least one wall having an opening which provides access to an interior of said frame; and
    a torque arm having one end movably attached to said frame.

8. The motor adapter as in claim 7, in which said torque arm is slidably mounted to a bar slidably mounted to said frame to movably fix said torque arm to said frame.

9. The motor adapter as in claim 8, in which said frame includes a pair of substantially parallel rails having slots, and said bar extends between said rails into said slots.

10. The motor adapter as in claim 9, in which said bar is fixable relative to said frame.

11. The motor adapter as in claim 7, in which said torque arm has a variable length.

12. The motor adapter as in claim 7, in which said torque arm is slidably mounted to a slotted rail fixed to said frame to slidably attach said torque arm to said frame.

13. A motor adapter comprising:
    a frame having a first end adapted for mounting to a motor and a second end adapted for mounting to a rotatably driven machine, said frame including first and second ends joined by at least one wall having an opening which provides access to an interior of said frame, and said frame including an adjustable reaction point;
    a torque arm fixed to said reaction point.

14. The motor adapter as in claim 13, in which said reaction point is on a bar fixed to said frame.

15. The motor adapter as in claim 14, in which said torque arm is slidably connected to said bar.

16. The motor adapter as in claim 14, in which said frame includes a pair of substantially parallel rails having slots, and said bar extends between said rails into said slots.

17. The motor adapter as in claim 13, in which said torque arm has a variable length.

18. The motor adapter as in claim 13, in which said torque arm is slidably mounted to a slotted rail fixed to said frame to slidably attach said torque arm to said frame.

* * * * *